(12) United States Patent
Mochizuki

(10) Patent No.: US 7,098,979 B2
(45) Date of Patent: Aug. 29, 2006

(54) ELECTRO-OPTICAL DEVICE AND ELECTRONIC APPARATUS COMPRISING CONVEX AND PROJECTED PORTIONS FORMED IN THE ALIGNMENT FILM AT THE PERIPHERY OF THE IMAGE DISPLAY AREA

(75) Inventor: Hiroaki Mochizuki, Chino (JP)

(73) Assignee: Seiko Epson Corporation, Tokyo (JP)

( * ) Notice: Subject to any disclaimer, the term of this patent is extended or adjusted under 35 U.S.C. 154(b) by 69 days.

(21) Appl. No.: 10/760,531

(22) Filed: Jan. 21, 2004

(65) Prior Publication Data

US 2004/0218129 A1    Nov. 4, 2004

(30) Foreign Application Priority Data

Feb. 4, 2003    (JP)    ............... 2003-027333

(51) Int. Cl.
    G02F 1/1343    (2006.01)
(52) U.S. Cl. ................................ 349/139; 349/123
(58) Field of Classification Search ........ 349/123–125, 349/139, 152, 149, 151
    See application file for complete search history.

(56) References Cited

U.S. PATENT DOCUMENTS

| | | | | |
|---|---|---|---|---|
| 5,953,094 A * | 9/1999 | Matsuoka et al. | .......... | 349/153 |
| 5,995,189 A | 11/1999 | Zhang | | |
| 6,433,767 B1 * | 8/2002 | Murade | ....................... | 345/92 |
| 6,433,841 B1 * | 8/2002 | Murade et al. | ................ | 349/43 |
| 6,636,192 B1 * | 10/2003 | Saitoh | .......................... | 345/87 |
| 6,842,211 B1 * | 1/2005 | Katsura | ...................... | 349/123 |
| 6,927,830 B1 * | 8/2005 | Chung et al. | ................ | 349/149 |

FOREIGN PATENT DOCUMENTS

| | | |
|---|---|---|
| JP | A 10-333182 | 12/1998 |
| JP | A-11-72804 | 3/1999 |
| JP | A-2000-81636 | 3/2000 |
| JP | A-2001-318380 | 11/2001 |
| JP | 2002-090749 | 3/2002 |
| JP | A-2002-229031 | 8/2002 |
| KR | 10-0355940 | 9/2002 |

* cited by examiner

Primary Examiner—Dung T. Nguyen
Assistant Examiner—Thoi V. Duong
(74) Attorney, Agent, or Firm—Oliff & Berridge, PLC

(57) ABSTRACT

In an electro-optical device of the present invention, data lines and scanning lines, thin film transistors (TFTs) and pixel electrodes formed correspondingly to intersections thereof, and an alignment film formed on the data lines, the scanning lines, the TFTs and the pixel electrodes are provided on a TFT array substrate. The TFT array substrate has an image display area defined as an area to form the pixel electrodes and the switching elements and a peripheral area which defines the periphery of the image display area, and convex portions are formed in the peripheral area. According to the electro-optical device, such as a liquid crystal device having the convex portions, it is possible to display images with a high quality, without causing deterioration of image quality due to cut dregs generated when performing a rubbing process on the alignment film.

10 Claims, 13 Drawing Sheets

F I G. 9
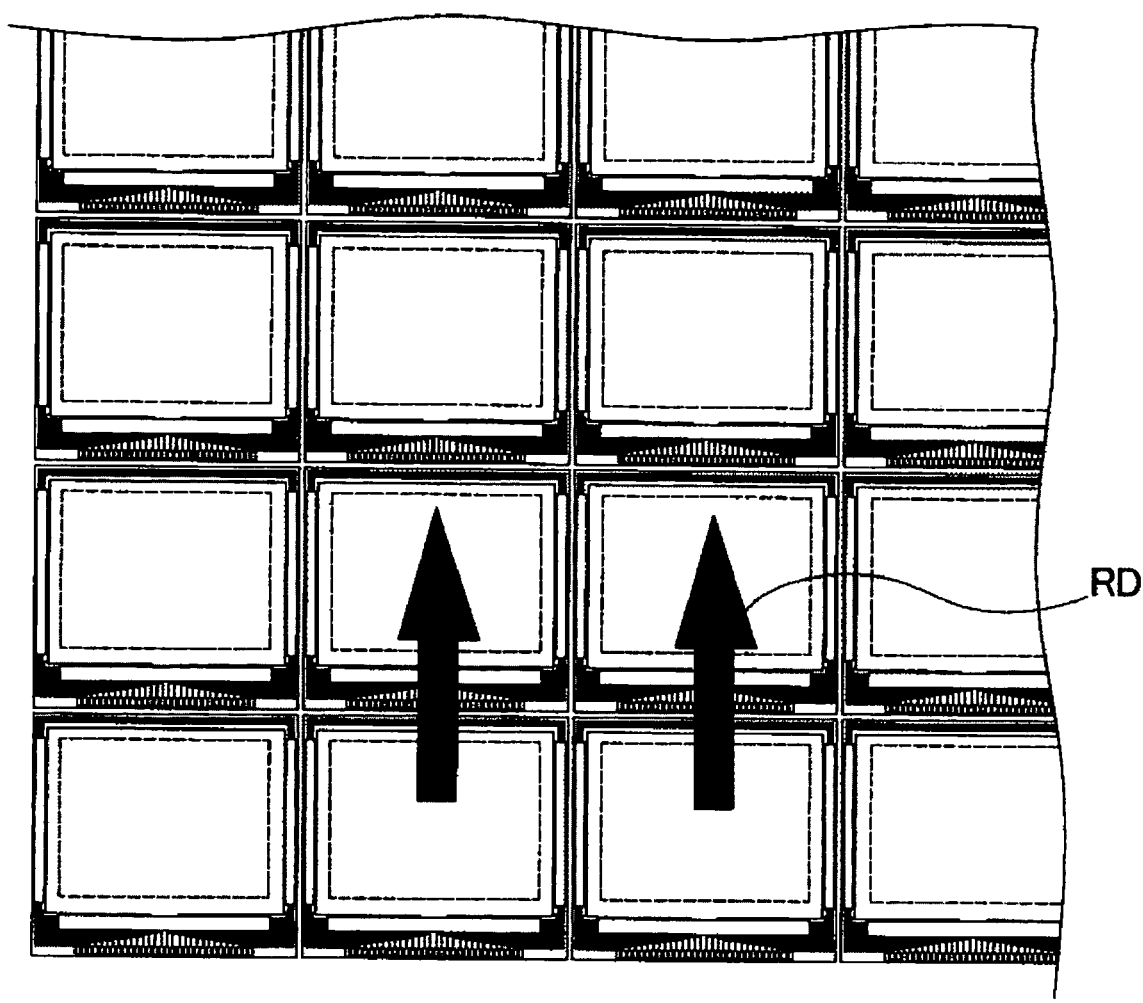

ELECTRO-OPTICAL DEVICE AND ELECTRONIC APPARATUS COMPRISING CONVEX AND PROJECTED PORTIONS FORMED IN THE ALIGNMENT FILM AT THE PERIPHERY OF THE IMAGE DISPLAY AREA

BACKGROUND OF THE INVENTION

1. Field of Invention

The present invention relates to an electro-optical device, such as an active matrix addressing liquid crystal display device, an electrophoresis device, such as an electronic paper, and other devices. In addition, the present invention relates to an electronic apparatus including such an electro-optical device.

2. Description of Related Art

Related art electro-optical devices include pixel electrodes arranged in a matrix, thin film transistors (hereinafter "TFTs") connected to each of the electrodes, and data lines and scanning lines which are connected to each of the TFTs and arranged in parallel in row directions and column directions, respectively, and in which a so-called active matrix addressing can be performed.

In addition to the elements described above, a liquid crystal display device, which is an example of the above electro-optical device, further includes a counter electrode arranged to face the pixel electrodes, a liquid crystal layer interposed between the pixel electrodes and the counter electrode, and alignment films formed on the pixel electrodes and the counter electrode, and can display images. That is, liquid crystal molecules in the liquid crystal layer having a predetermined alignment state depending on the alignment films can properly change the alignment state due to a predetermined potential difference set between the pixel electrodes and the counter electrode, and as a result, transmittance of light passing through the liquid crystal layer can be varied, so that an image display can be formed.

In this case, specifically, the alignment film performs the function of holding the liquid crystal molecules to which an electric field is not applied in a predetermined alignment state. In order to perform this function, the alignment film can be made of polymeric organic compounds, such as polyimide, and then is subjected to a rubbing process. Herein, the rubbing process means a process of rubbing the surface of the alignment film after baking with a buff cloth wound around a rotational metal roller, etc., in a predetermined direction. As a result, a main chain of a polymer is elongated in the predetermined direction, so that the liquid crystal molecules are arranged in the direction of elongation.

However, in the rubbing process, cut dregs of the alignment film are generated. If the cut dregs remain between the pixel electrodes and the counter electrode, realization of a predetermined alignment state corresponding to the potential difference applied between the two electrodes may be reduced or prevented (that is, alignment failure may be caused), so that deterioration of image quality may occur (for example, light leakage may occur).

A related art technology to address or solve the above problem is disclosed in Japanese Unexamined Patent Application Publication No. 10-333182 (hereinafter "JP 182"). In this technology, regarding the array pitch of the pixel electrodes, by arranging at least one row or one column of non-display dummy pixel pattern in which the array pitch deviates from the pitch of the electrodes, the cut dregs are captured by the non-display dummy pixel, thereby reducing or preventing the deterioration of image quality. Since the array pitch of the non-display dummy pixel deviates from that of pixel electrodes, the coefficient of friction is increased in the rubbing process, so that even employing fewer non-display dummy pixel rows or columns, effects similar to several rows or columns of non-display dummy pixels can be obtained.

SUMMARY OF THE INVENTION

However, the above liquid crystal display device is subject to the following problems. First, in the technology described above, by providing fewer non-display dummy pixels using a device to deviate the pixel pitch, the same advantages as several rows or columns of non-display dummy pixels can be obtained, but there is a limit. For example, in an embodiment of JP 182, an example is disclosed in which one or two rows of non-display dummy pixel pattern or non-display dummy color pattern are provided, but the disadvantage due to the cut dregs cannot be solved sufficiently by this alone. For example, according to the present inventor's study, in spite of providing four to ten rows of dummy pixels, it was observed that the defect described above appears again.

Further, the dummy pixels are formed basically to address or solve operational problems, such as generation of display unevenness. That is, the number of dummy pixel arrays should be first determined in consideration of addressing or solving the problem, such as the display unevenness. Then, the objective of addressing or solving the disadvantage of the cut dregs should be addressed by considering the addition of more dummy pixel arrays. That is, a solution that the number of dummy pixel arrays is first set up to solve the problem, such as the display unevenness, and in addition, the dummy pixels are then provided to address or solve the problem of the cut dregs, if any, is basically required.

However, this solution may excessively increase the number of dummy pixel arrays, enlarging the liquid crystal display device. This is contrary to recent demand for small-sized and highly accurate liquid crystal display device. Further, since the dummy pixels are also pixels, arrangement of multiple dummy pixels requires peripheral measures, such as elongating the associated driving circuits correspondingly, and thus causes an undesirable increase of manufacturing cost. Therefore, the number of dummy pixel arrays should be reduced or minimized from this point of view. Above all, although it may be attempted to simultaneously address or solve the problem of the cut dregs by the number of dummy pixel arrays sufficient to address or solve the display unevenness, this method has a limit as described above in relation to JP 182.

Comprehensively considering the above situations, as a result, provision of dummy pixels cannot be rejected, but the extent to which the problem of cut dregs is addressed or solved using only the "dummy pixels" has a limit, so that the solution is not necessarily an effective measure.

The present invention addresses the above or other problems, and provides an electro-optical device, capable of performing a high-quality image display without causing deterioration of image quality due to cut dregs generated on a rubbing process on an alignment film, and an electronic apparatus including the electro-optical device.

In order to address or accomplish the above, an electro-optical device according to the present invention includes, on a substrate, data lines extending in a certain direction and scanning lines extending in a direction crossing the data lines; switching elements to which a scanning signal is supplied through the scanning lines; pixel electrodes to which an image signal is supplied through the data lines and the switching elements; and an alignment film formed on the pixel electrodes. Herein, the substrate has an image display area defined as an area for forming the pixel electrodes and the switching elements, and a peripheral area defining the periphery of the image display area. The alignment film is formed in the image display area and the peripheral area, and convex portions are formed in at least a part of the peripheral area.

According to the electro-optical device of the present invention, by supplying scanning signals through the scanning lines to the thin film transistors which are an example of switching elements, ON/OFF states thereof are controlled. On the other hand, the pixel electrodes are supplied with image signals through the data lines, and the image signals are applied or not applied to the pixel electrodes, correspondingly to the ON/OFF states of the thin film transistors. As a result, the electro-optical device according to the present invention can perform a so-called active matrix addressing.

Then, in the present invention, specifically, the substrate has the image display area and the peripheral area, and the convex portions are formed in at least a part of the peripheral area. Accordingly, the following operational advantages can be obtained. That is, first, when performing a rubbing process on the alignment film formed on the pixel electrodes, the rubbing process is carried out in a constant direction. Therefore, the rubbing process is performed to the alignment film on the peripheral area before performing the rubbing process on the alignment film on the image display area. In the course of the rubbing process, cut dregs of the alignment film are generated necessarily. The cut dregs are mainly attached to a rotational roller typically used for the rubbing process. For this reason, for example, when the rubbing process is simultaneously performed to a glass substrate in which a plurality of electro-optical devices described above is formed, the cut dregs attached to the rotational roller may drop onto the image display area.

On the contrary, in the present invention, since the convex portions are formed in the peripheral area, the cut dregs attached to the rotational roller used for the rubbing process as described above are detached from the rotational roller by the convex portions. The cut dregs generated in the rubbing process are concentrated around the convex portions.

The reason can be easily understood by analogy. For example, the rubbing process can be thought of as being carried out in a "terrain" in which a "mountain range" having a convex shape is successive to a relatively flat "plain". That is, in this case, when the "plain" is first subjected to the rubbing process, since the rotational roller does not undergo a large resistance, the cut dregs attached to the rotational roller hardly drop onto the alignment film. However, when the rotational roller reaches a "mountain" constituting a head of the "mountain range" successive to the "plain", the rotational roller undergoes a much larger resistance than the previous one. Therefore, the cut dregs attached to the rotational roller are first detached in the "mountain" portion by a relatively large amount. Thereafter, when the rotational roller goes on over the "mountain range", the cut dregs attached to the rotational roller are gradually detached therefrom, so that when the rotational roller reaches the image display area, the cut dregs are hardly detached by a large amount to drop onto the image display area.

As a result, according to the present invention, it is possible to allow the cut dregs generated in the rubbing process to exist mainly around the convex portions on the peripheral area, and not to allow the cut dregs to reach the image display area. Accordingly, in the image display area, since generation of alignment failure due to the cut dregs can be reduced or prevented, it is possible to display an image with a higher quality.

Further, since the present invention does not try to address or solve the problem of the cut dregs through existence of dummy pixels, a disadvantage, such as enlargement of an electro-optical device following it, cannot be caused. On the contrary, according to the present invention, it is possible to better accomplish miniaturization and high accuracy of an electro-optical device. On the other hand, since the dummy pixels address or solve the operational problem, such as generation of display unevenness, the dummy pixels may be provided. In the aforementioned description of the present invention, the "mountain range" can be supposed to typically include a plurality of convex portions, but can be occasionally thought of as a "mountain range" having only one "mountain". The term "mountain range" described above or below includes such a case.

In one aspect of the electro-optical device of the present invention, the electro-optical device further includes a driving circuit on the substrate, and the convex portions are provided in an area between the image display area and the driving circuit. Further, in another aspect, a dummy pixel forming area is formed outside the image display area, and the convex portions are formed outside the dummy pixel forming area.

In one aspect of the electro-optical device of the present invention, projected portions caused by a height of at least one of the data lines and the scanning lines are formed in the alignment film, and the height of the convex portions is equal to that of the projected portions.

According to this aspect, the projected portions caused by the height of the data lines or the scanning lines are formed on the alignment film in the image display area. In this case, since the aforementioned "mountain range" can be better formed using the projected portions and the convex portions according to the present invention, the operational advantage of allowing the cut dregs of the alignment film to exist mainly around the convex portions and not to reach the image display area (hereinafter "the operational advantage according to the present invention") can be better obtained.

In this aspect, specifically, the height of the convex portions is equal to that of the projected portions, so that the operational advantage according to the present invention can be more surely obtained. On the contrary, if the height of the convex portions is much larger than that of the projected portions, it may cause the rubbing process to be largely hindered. In this aspect, such a disadvantage is not caused.

The "equal" mentioned in this aspect includes not only a case that the height of the convex portions is completely equal to the height of the projected portions, but also a case that the former is slightly larger than or slightly smaller than the latter. Even in these cases, unless the height of the convex portions is "too" large, the aforementioned disadvantage is not caused. In addition, a specific value when "slightly larger" or "too" large is mentioned is basically design requirements, and the suitable value is determined in consideration of a size of the electro-optical device, a size of the image display area or the peripheral area, and aspects of forming the data lines, or the scanning lines, or the projected portions.

As is clear from the description of this aspect, in the present invention, existence of the projected portions caused by the height of the data lines or the scanning lines is not premised necessarily. The reason is that even if the projected portions do not exist (that is, for example, even if the alignment film on the image display area is planarized), it is possible to make the aforementioned "mountain range" by using only "the convex portions" (see a construction of "linear convex portions" described below).

In another aspect of the electro-optical device of the present invention, projected portions caused by a height of at least one of the data lines and the scanning lines are formed in the alignment film, and the convex portions are formed along a direction in which the projected portions extend.

According to this aspect, first due to existence of the projected portions, it is possible to better obtain the operational advantages according to the present invention, similarly to the aforementioned aspect.

In this aspect, specifically, the convex portions are formed along the direction in which the projected portions extend. That is, if the projected portions are caused by the height of the scanning lines, the convex portions are formed along the direction in which the scanning lines extend. As a result, since the aforementioned "mountain range" can be better formed, it is possible to more effectively obtain the operational advantage according to the present invention.

In this aspect, the convex portions may be formed parallel to the direction in which the projected portions extend.

According to this construction, since the projected portions are caused by the height of the data lines or the scanning lines, the projected portions are formed successively in one direction or in a direction crossing the one direction, and the convex portions are also formed successively to correspond thereto. As a result, since the aforementioned "mountain range" can be better formed, it is possible to more effectively obtain the operational advantage according to the present invention.

In an aspect in which the convex portions are formed in a direction of the projected portions, the convex portions may comprise a plurality of linear convex portions which are formed along the direction in which the projected portions extend.

According to the above construction, since the aforementioned "mountain range" can be better formed by forming a plurality of rows or columns of linear convex portions together with a plurality of rows or columns of projected portions on the data lines or the scanning lines, it is possible to more effectively obtain the operational advantage according to the present invention.

Since the "linear convex portions" mentioned in this aspect include a meaning that the linear convex portions have a two-dimensional shape in which a longitudinal length of the line shape is longer than a length in a direction crossing the longitudinal length in plan view, intermittent convex portions may be included in the "linear convex portions", in addition to the aforementioned "continuous" convex portions.

In this construction, the pitch between the linear convex portions may be equal to the pitch between the projected portions.

According to the above construction, since the pitch between the linear convex portions is equal to the pitch between the data lines or the scanning lines, when the rubbing process is performed from the peripheral area to the image display area, it is possible not to largely change an aspect of the process specifically in an interface between the peripheral area and the image display area. That is, in this aspect, from such a point of view, the aforementioned "mountain range" can be better formed, so that it is possible to more effectively obtain the operational advantage according to the present invention.

The pitch between the linear convex portions may be gradually increased or gradually decreased with increasing distance from the image display area, from a place close to the image display area to a place apart from the image display area.

According to the above construction, since the pitch between the linear convex portions is gradually increased or gradually decreased with increasing distance from the image display area, when the rubbing process is performed from the peripheral area to the image display area, a drastic change is not caused in the aspect of the process, specifically between the peripheral area and the image display area, or within the peripheral area. That is, in this aspect, from such point of view, since the aforementioned "mountain range" can be better formed, it is possible to more effectively obtain the operational advantage according to the present invention.

In addition to a case where the pitch between the linear convex potions is equal to, or becomes gradually larger than, or becomes gradually smaller than, the pitch between the projected portions, a case where the pitch is random is covered by the invention.

In the aspects described above, even if the example where the convex portions are formed in a direction of the projected portions, the example where the convex portions are formed successively to the projected portions and the example where the plurality of linear convex portions are formed (which includes the construction that the pitch between the linear convex portions is equal to, or becomes gradually larger than, or becomes gradually smaller than, the pitch between the projected portions) are expressed in other words as follows, the expressions fall within a scope of the present invention. That is, in a case where the image display area of the electro-optical device is planarized and the projected portions do not thus exist, "the direction of the projected portions" can be replaced with "the direction of at least one side of the data lines and the scanning lines", and "the pitch between the projected portions" can be replaced with "the pitch between at least one side of the data lines and the scanning lines". This is based on a fact that the electro-optical device according to the present invention does not necessarily require existence of the projected portions.

In another aspect of the electro-optical device of the present invention, the convex portions are formed along the peripheral portions of the image display area opposite to the direction of the rubbing process performed on the alignment film.

According to this aspect, the convex portions necessarily exist before reaching the image display area, as going on along the direction of the rubbing process. From another viewpoint of this aspect, it means that the convex portions need not be necessarily formed in places deviated from the direction of the rubbing process. Therefore, according to this aspect, only by forming the convex portions in a minimum, it is possible to obtain the operational advantage according to the present invention.

In another aspect of the electro-optical device of the present invention, the substrate is a rectangular outer configuration in plan view, and the image display area has a shape similar to the outer configuration of the substrate, and the convex portions are formed along one side or two adjacent sides of the image display area.

According to this aspect, the convex portions are formed along one side or two sides of the image display area having a rectangular shape. First, in a case where the convex portions are formed along one side of the image display area, it is possible to obtain the operational advantage according to the present invention by setting the direction of the rubbing process to cross the relevant one side. On the other hand, in a case where the convex portions are formed along two adjacent sides of the image display area, even if the direction of the rubbing process is oblique, it is possible to obtain the operational advantage according to the present invention.

In another aspect of the electro-optical device of the present invention, the convex portions are caused by the height of a pattern formed of the same film as at least a part of the data lines, the scanning lines, and the switching elements.

According to this aspect, the convex portions can be relatively easily formed. That is, according to this aspect, the pattern made of the same film as at least a part of the data lines, the scanning lines and the switching elements is first formed on the substrate. It can be contemplated that this pattern is formed to be two-dimensionally separate from the data lines, the scanning lines or the switching elements. Then, by superposing to form various kinds of interlayer insulating films, etc., thereon, the convex portions caused by a height of the pattern can be formed on the alignment film. That is, according to this aspect, a specific process is not required for forming the convex portions, and it is thus possible to relatively easily form the convex portions.

For example, when the switching elements comprise a plurality of elements such as a semiconductor layer (an active layer), a gate insulating film, and a gate electrode, the words "at least a part" mentioned in this aspect include a meaning of at least a part of the plurality of elements. In addition, when the data lines have a double-layer structure, the words may include any one layer, and the words may include the data lines or a part thereof and the scanning lines.

In the present invention, storage capacitors to enhance a potential holding characteristic of the pixel electrodes or light-shielding film, etc., may be formed in the electro-optical device, in addition to the data lines, the scanning lines and the switching elements, but in this case, the "pattern" according to this aspect may be formed of the same film as the various elements.

In order to accomplish the above object, an electronic apparatus of the present invention includes the aforementioned electro-optical device (provided that it includes various aspects thereof) according to the present invention.

Since the electronic apparatus of the present invention includes the aforementioned electro-optical device, deterioration of image quality due to the cut dregs of the alignment film is not caused, so that it is possible to implement various electronic apparatuses, such as a projector, a liquid crystal TV, a mobile phone, an electronic pocket book, a word processor, a view finder type or monitor direct view-type video tape recorder, a work station, a television phone, a POS terminal, a touch panel and the like, for example, which are capable of displaying images having excellent display quality.

Such operation and other advantages of the present invention will be apparent from exemplary embodiments described below.

BRIEF DESCRIPTION OF THE DRAWINGS

FIG. 9 is a plan view illustrating a plurality of TFT array substrates constructed on a glass substrate;

DETAILED DESCRIPTION OF PREFERRED EMBODIMENTS

Exemplary embodiments of the present invention are described below with reference to the figures. In the following exemplary embodiments, an electro-optical device according to the present invention is applied to a liquid crystal display device.

(First Exemplary Embodiment)

Figure 1:
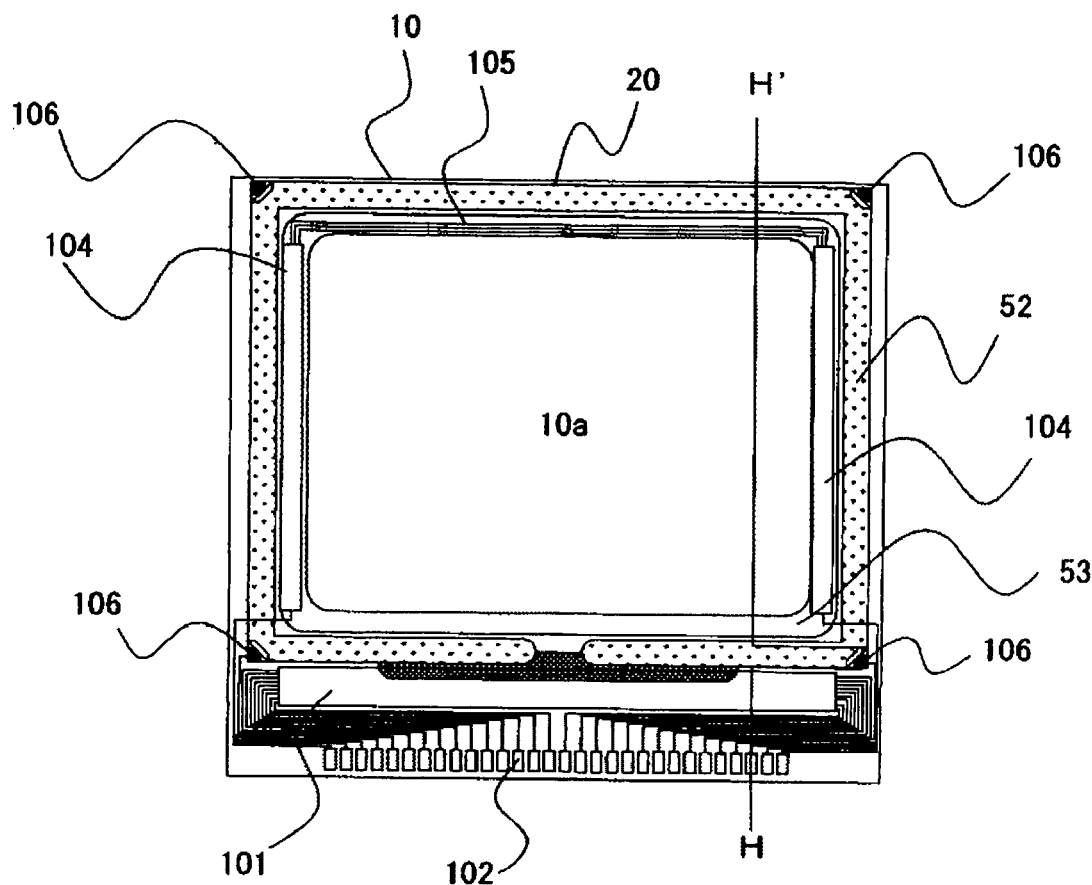
FIG. 1 is a plan view of an electro-optical device according to a first exemplary embodiment of the present invention.
Figure 2:
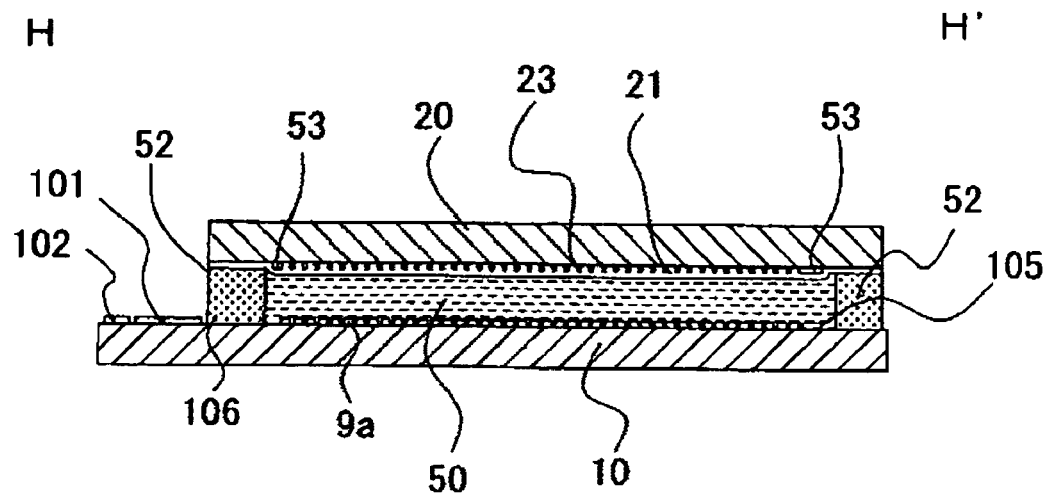
FIG. 2 is a cross-sectional view taken along plane H–H' of FIG. 1.

First, the whole construction of a first exemplary embodiment according to the electro-optical device of the present invention is described with reference to FIGS. 1 and 2. FIG. 1 is a plan view of an electro-optical device, in which a TFT array substrate along with various elements formed thereon is viewed from a counter substrate side, and FIG. 2 is a cross-sectional view taken along plane H–H' of FIG. 1. A TFT active matrix addressing liquid crystal display device having driving circuits built-in, which is an example of the electro-optical device, is described as one example.

In FIGS. 1 and 2, in the electro-optical device according to the first exemplary embodiment, a TFT array substrate 10 and a counter substrate 20 are arranged to face each other. A liquid crystal layer 50 is filled and sealed between the TFT array substrate 10 and the counter substrate 20, and the TFT array substrate 10 and the counter substrate 20 are bonded to each other using a sealing member 52 provided in a seal area positioned around an image display area 10a.

The sealing member 52 is made of, for example, ultraviolet setting resin, thermosetting resin or the like, so as to bond both substrates, and is applied onto the TFT array substrate 10 in a manufacture process and hardened by application of an ultraviolet ray, heating, or the like. In order to set a gap (inter-substrate gap) between the TFT array substrate 10 and the counter substrate 20 to a constant value, a gap material, such as glass fiber or glass bead, is dispersed in the sealing member 52. That is, the electro-optical device according to the first exemplary embodiment is used as a light valve of a projector, and is small-sized and suitable for an enlargement display.

In the counter substrate 20, a frame-shaped light shielding film 53 to define a frame area of the image display area 10a is provided in parallel inside the seal area in which the sealing member 52 is provided. A part or all of the frame-shaped light shielding film 53 may be provided as a built-in light shielding film in the TFT array substrate 10. In the first exemplary embodiment, a peripheral area for defining a periphery of the aforementioned image display area 10a exists. In other words, in the first exemplary embodiment, specifically as viewed from a center of the TFT array substrate 10, an area which covers from the frame-shaped light shielding film 53 to outer circumferential edges of the substrate is defined as the peripheral area.

In an area positioned outside the seal area of the peripheral area in which the sealing member 52 is provided, specifically a data line driving circuit 101 and external circuit connection terminals 102 are provided along one side of the TFT array substrate 10. Further, scanning line driving circuits 104 are provided along two sides adjacent to the one side to be covered with the frame-shaped light shielding film 53. Furthermore, in order to connect two scanning line driving circuits 104 each other provided in both sides of the image display area 10a, a plurality of wires 105 are provided along the remaining one side of the TFT array substrate 10 to be covered with the frame-shaped light shielding film 53.

In four corner portions of the counter substrate 20, up-and-down connection members 106 serving as up-and-down connection terminals between both substrates are provided. On the other hand, up-and-down connection terminals are provided in portions of the TFT array substrate 10 opposing the above corner portions. Through the up-and-down connection terminals, electric connection between the TFT array substrate 10 and the counter substrate 20 is accomplished.

In FIG. 2, on the TFT array substrate 10, an alignment film is formed on pixel electrodes 9a after pixel switching TFTs or wires, such as the scanning lines, the data lines, etc., have been formed. On the other hand, on the counter substrate 20, a lattice-shaped or stripe-shaped light shielding film 23 are formed in addition to a counter electrode 21, and an alignment film is formed as the uppermost layer. The liquid crystal layer 50 is made of, for example, a liquid crystal obtained by mixing one kind or several kinds of nematic liquid crystal, and it has a predetermined alignment state between a pair of alignment films.

On the TFT array substrate 10 shown in FIGS. 1 and 2, a sampling circuit to sample image signals in image signal lines and supply the image signals to the data lines, a precharge circuit to supply precharge signals having a predetermined voltage level to the plurality of data lines prior to the image signals, a test circuit to check quality, defects, etc., of the relevant electro-optical device in the course of manufacture thereof or in loading, and so on may be formed in addition to the data line driving circuit 101 and the scanning line driving circuits 104.

In the first exemplary embodiment, specifically in a predetermined area between the data line driving circuit 101 and the image display area 10a in the peripheral area, convex portions 401 are formed. This is described in detail below.

Figure 3:
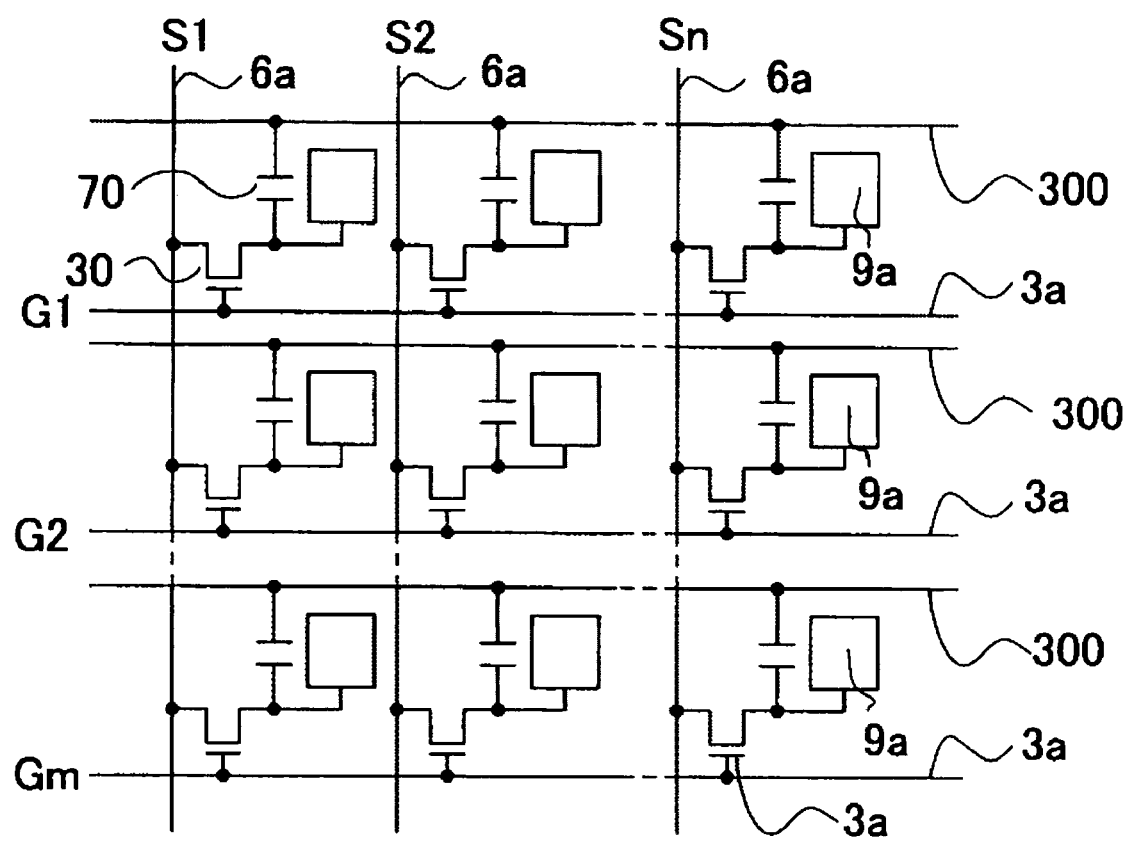
FIG. 3 is a schematic circuit diagram illustrating an equivalent circuit of various elements, wires, and so on provided in a plurality of pixels arranged in a matrix shape to constitute an image display area in the electro-optical device according to the first exemplary embodiment of the present invention.

Next, a construction inside the image display area 10a of the electro-optical device according to the first exemplary embodiment is described with reference to FIG. 3. FIG. 3 is a circuit diagram illustrating an equivalent circuit of various elements, wires, and so on provided in a plurality of pixels arranged in matrix constituting the image display area 10a in the electro-optical device.

In FIG. 3, a pixel electrode 9a and a TFT 30 to switch and control the pixel electrode 9a are formed in each of a plurality of pixels formed in matrix, and a data line 6a through which the image signals are supplied is electrically connected to a source of the relevant TFT 30. The image signals S1, S2, . . . , Sn to be written may be line-sequentially supplied to the data line 6a, and may be supplied to a plurality of data lines 6a adjacent each other by group.

Further, scanning lines 3a are electrically connected to gates of the TFTs 30, and scanning signals G1, G2, . . . , Gm are line-sequentially supplied to the scanning lines 3a at a predetermined timing in a pulse-like way. The pixel electrodes 9a are electrically connected to drains of the TFTs 30, and by turning on the TFTs 30 which are the switching elements for a constant time interval, the image signals S1, S2, . . . , Sn supplied from the data lines 6a are written at a predetermined timing.

The image signals S1, S2, . . . , Sn of a predetermined level written to a liquid crystal as an example of an electro-optical material through the pixel electrodes 9a are held between the pixel electrodes and a counter electrode 21 (see FIG. 2) formed on the counter substrate 20 for a predetermined time. The liquid crystal, in which alignments or orders of molecule sets are varied in accordance with a voltage level applied thereto, modulates light to make a gray scale display possible. In a normally-white mode, transmittance of the input light is decreased in accordance with the voltage applied thereto by pixel, and in a normally-black mode, the transmittance of the input light is increased in accordance with the voltage applied thereto by pixel, so that light having a contrast corresponding to the image signals is emitted from the electro-optical device as a whole. In order to reduce or prevent the held image signals from being leaked, storage capacitors 70 are added in parallel with liquid crystal capacitors formed between the pixel electrodes 9a and the counter electrode. The storage capacitors 70 are formed parallel to the scanning lines 3a, and include capacitor lines 300 as capacitor electrodes of fixed potential side fixed to a constant potential.

Figure 4:
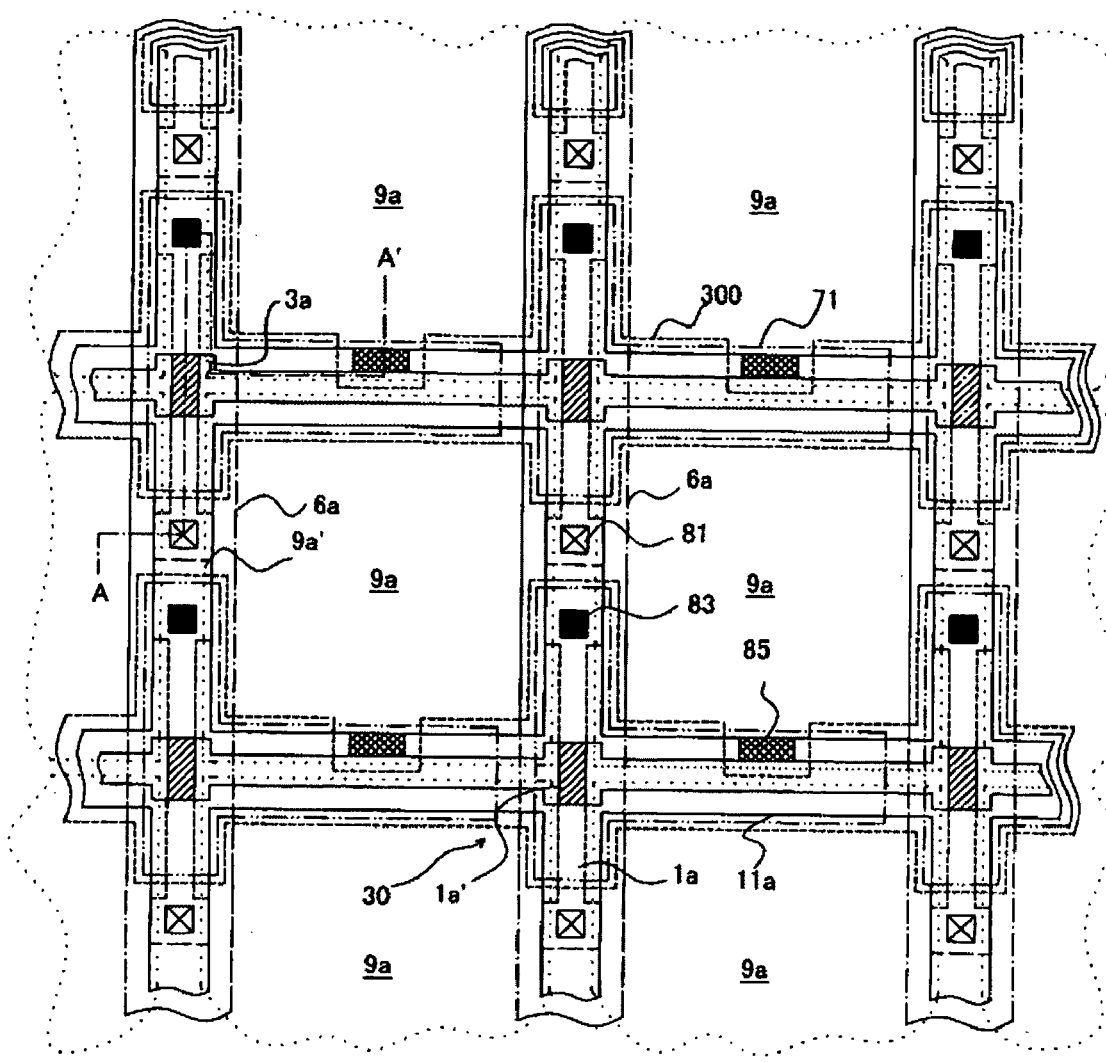
FIG. 4 is a plan view of a plurality of pixels adjacent to each other in a TFT array substrate in which data lines, scanning lines and pixel electrodes are formed in the electro-optical device according to the first exemplary embodiment of the present invention.
Figure 5:
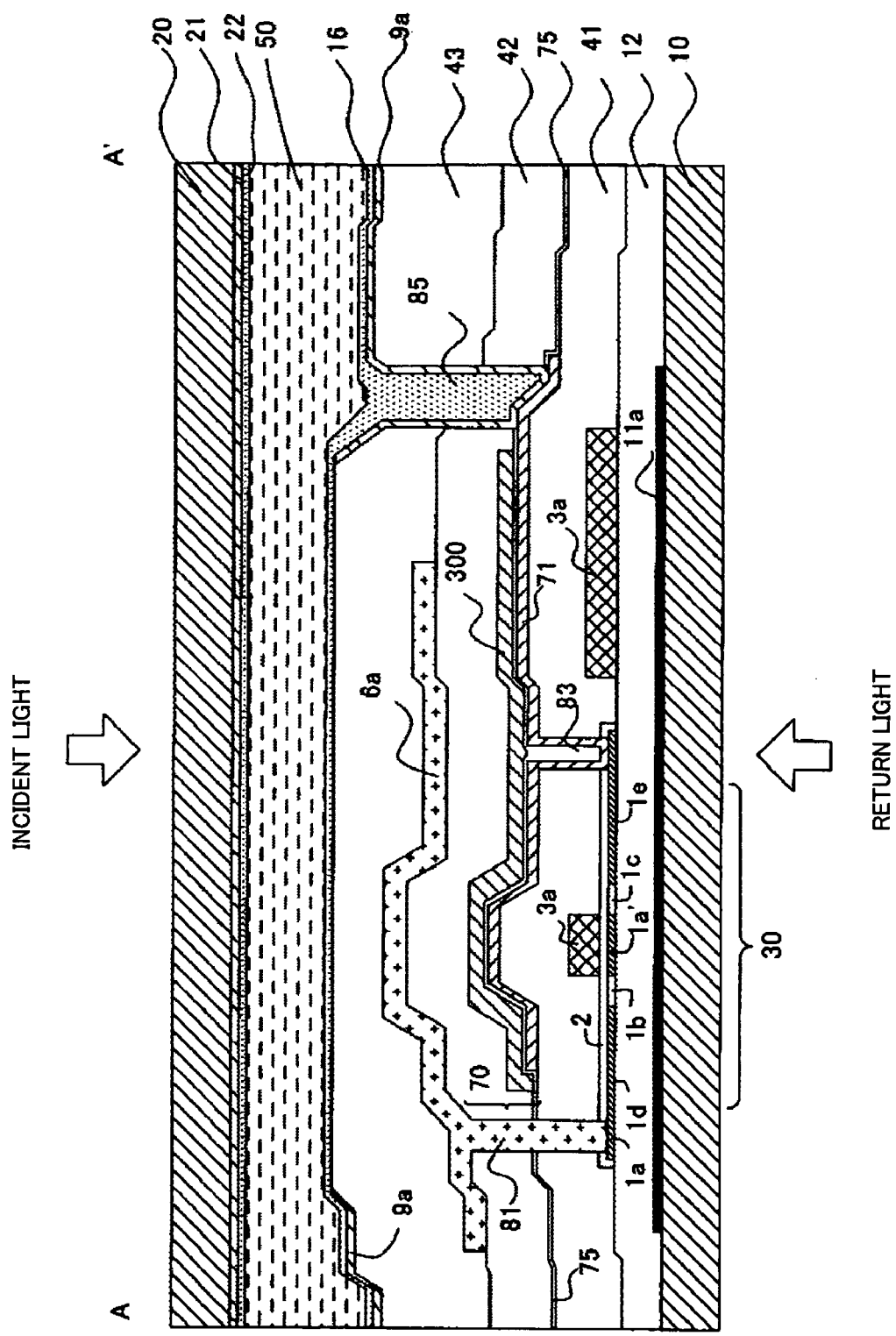
FIG. 5 is a cross-sectional view taken along plane A–A' of FIG. 4.

Next, a more specific construction of the electro-optical device in which the aforementioned circuit operation is executed by the data lines 6a, the scanning lines 3a and the TFTs 30 is described with reference to FIGS. 4 and 5. FIG. 4 is a plan view of a plurality of pixels adjacent to each other in the TFT array substrate on which the data lines, the scanning lines and the pixel electrodes, etc., are formed, and FIG. 5 is a cross-sectional view taken along plane A–A' of FIG. 4. In FIG. 5, in order to make the respective layers or the respective members recognizable from the figure, the respective layers and the respective members have different scales.

First, the electro-optical device according to the first exemplary embodiment includes the transparent TFT array substrate 10 and the transparent counter substrate 20 arranged to face the TFT array substrate, as shown in FIG. 5 which is a cross-sectional view taken along plane A–A' of FIG. 4. The TFT arrays substrate 10 is formed of, for example, a quartz substrate, a glass substrate, a silicon substrate or the like, and the counter substrate 20 is formed of, for example, a glass substrate or a quartz substrate.

As shown in FIG. 5, the pixel electrodes 9a are provided on the TFT array substrate 10, and an alignment film 16 to which a predetermined alignment process such as a rubbing process has been performed is formed thereon. The pixel electrodes 9a are formed of a transparent conductive film, such as an ITO film. On the other hand, the counter electrode 21 is provided on the whole surface of the counter substrate 20, and in the lower part of the figure, an alignment film 22 to which a predetermined alignment process such as a rubbing process is performed is provided. The counter electrode 21 is formed of a transparent conductive film such as an ITO film, similarly to the pixel electrodes 9a described above. The aforementioned alignment films 16, 22 are formed of a transparent organic film such as a polyimide film.

On the other hand, in FIG. 4, the pixel electrodes 9a (of which profiles are expressed by dotted lines 9a') are provided in a matrix shape on the TFT array substrate 10, and the data lines 6a and the scanning lines 3a are provided along lengthwise and breadthwise boundaries of the pixel electrodes 9a. The data lines 6a are formed of a metal film such as an aluminum film or an alloy film thereof, and the scanning lines 3a are formed of, for example, a conductive poly silicon film. The scanning lines 3a are arranged to face channel regions 1a' hatched in a right and upper direction of the figure in a semiconductor layer 1a, and the scanning lines 3a serve as gate electrodes. That is, the pixel switching TFTs 30, in which main line portions of the scanning lines 3a are arranged as the gate electrodes to face the channel regions 1a', are provided in intersections of the scanning lines 3a and the data lines 6a, respectively.

Each TFT 30 has an LDD (Lightly Doped Drain) structure as shown in FIG. 5, and as described above, includes a scanning line 3a serving as a gate electrode, a channel region 1a' of the semiconductor layer 1a' which is formed of, for example, a poly silicon film and in which a channel is formed by an electric field from the scanning line 3a, an insulating film 2 including a gate insulating film to insulate the semiconductor layer 1a from the scanning line 3a, and a low-concentration source region 1b, a low-concentration drain region 1c, and a high-concentration source region 1d and a high-concentration drain region 1e formed in the semiconductor layer 1a.

Further, although it is preferable that each TFT 30 has an LDD structure as shown in FIG. 5, the TFT may have an offset structure in which impurities are not implanted into the low-concentration source region 1b and the low-concentration drain region 1c, and may be a self-aligned TFT in which the high-concentration source region and the high-concentration drain region are formed in a self-alignment way by implanting impurities with a high concentration by using a gate electrode formed of a part of the scanning line 3a as a mask. In the first exemplary embodiment, the gate electrodes of the pixel switching TFTs 30 are described as a single-gate structure in which only one gate electrode is provided between the high-concentration source region 1d and the high-concentration drain region 1e, but two or more gate electrodes may be provided therebetween. By forming a TFT with dual gates or triple gates or more, a leak current generated in junctions between the channel region and the source and drain regions can be prevented, so that it is possible to decrease an off current. It does not make a difference whether the semiconductor layer 1a constituting the TFTs 30 is an amorphous layer or a mono-crystalline layer. Related art or well-known methods, such as a bonding method, may be used to form the mono-crystalline layer. By forming the semiconductor layer 1a out of a mono-crystalline layer, it is possible to accomplish specifically high-performance peripheral circuits.

On the other hand, in FIG. 5, each storage capacitor 70 is formed such that a relay layer 71 as a capacitor electrode of pixel potential side connected to the high-concentration drain region 1e of the TFT 30 and the pixel electrode 9a and a part of the capacitor line 300 as a capacitor electrode of fixed potential side are arranged to face each other through a dielectric film 75. The storage capacitors 70 can allow to remarkably enhance a potential holding characteristic in the pixel electrodes 9a.

The relay layer 71 is formed of, for example, a conductive poly silicon film, and serves as the capacitor electrode of pixel potential side. The relay layer 71 has a single layer structure or a multi-layer structure containing metal or alloy, similarly to the capacitor lines 300 is described below. The relay layer 71 has a function of relay-connecting the pixel electrode 9a and the high-concentration drain region 1e of the TFT 30 through contact holes 83 and 85, in addition to a function as the capacitor electrode of pixel potential side.

The capacitor lines 300 are formed of a conductive film containing, for example, metal or alloy, and serve as the capacitor electrodes of fixed potential side. The capacitor lines 300 are formed, as shown in FIG. 4, to overlap with areas in which the scanning lines 3a are formed in plan view. More specifically, each capacitor line 300 has a main line portion extending along the scanning lines 3a, projected portions projected upward along the data lines 6a from the respective intersections with the data lines 6a in the figure, and recessed portion slightly recessed in places corresponding to the contact holes 85. The projected portions contribute to area enlargement of the storage capacitors 70 by using the area above the scanning line 3a and the area below the data lines 6a. The capacitor lines 300 are preferably formed of a conductive light shielding film containing a metal having a high melting point or an alloy thereof, and have a function as a light shielding layer for shielding the TFTs 30 from input light in the upper side of the TFTs 30, in addition to a function as the capacitor electrodes of fixed potential side of the storage capacitors 70.

The dielectric film 75, as shown in FIG. 5, is formed of a silicon oxide film such as a relatively thin HTO (High Temperature Oxide) or LTO (Low Temperature Oxide) film having a thickness of about 5 to 200 nm, or a silicon nitride film. From the view point for enhancing the storage capacitor 70, the thinner the dielectric film 75 is, the more preferable it is, as long as sufficient reliability of a film can be obtained.

In FIGS. 4 and 5, a lower light shielding film 11a is further provided below the TFTs 30. The lower light shielding film 11a is patterned in a lattice shape or in a stripe shape, whereby an opened area of each pixel is defined. The opened area is also defined by the data lines 6a and the capacitor lines 300 formed to intersect the data lines in FIG. 4.

A base insulating film 12 is formed under the TFTs 30. Since the base insulating film 12 is formed on the whole surface of the TFT array substrate 10, the base insulating film has a function of reducing or preventing variation of characteristics of the pixel switching TFTs 30 due to roughness in a surface polishing process on the TFT array substrate 10 or contamination remaining after a washing process, in addition to a function of insulating the TFTs 30 from the lower light shielding film 11a.

In addition, a first interlayer insulating film 41 in which the contact holes 81 communicating with the high-concentration source regions 1d and the contact holes 83 communicating with the high-concentration drain regions 1e are opened, respectively, is formed on the scanning lines 3a. The relay layer 71 and the capacitor lines 300 are formed on the first interlayer insulating film 41, and a second interlayer insulating film 42 in which the contact holes 81 communicating with the high-concentration source regions 1d and the contact holes 85 communicating with the relay layer 71 are opened, respectively, is formed thereon. The data lines 6a are formed on the second interlayer insulating film 42, and a third interlayer insulating film 43 in which the contact holes 85 communicating with the relay layer 71 are formed is formed thereon. In the first exemplary embodiment, a baking process of about 1000° C. may be carried out to the first interlayer insulating film 41 to accomplish activation of ions implanted into the poly silicon film constituting the semiconductor layer 1a or the scanning lines 3a. On the other hand, by not carrying out such baking process to the second interlayer insulating film 42, alleviation of stress generated in the vicinity of interfaces of the capacitor lines 300 can be accomplished.

(Construction of Convex Portions on Peripheral Area)

Figure 6:
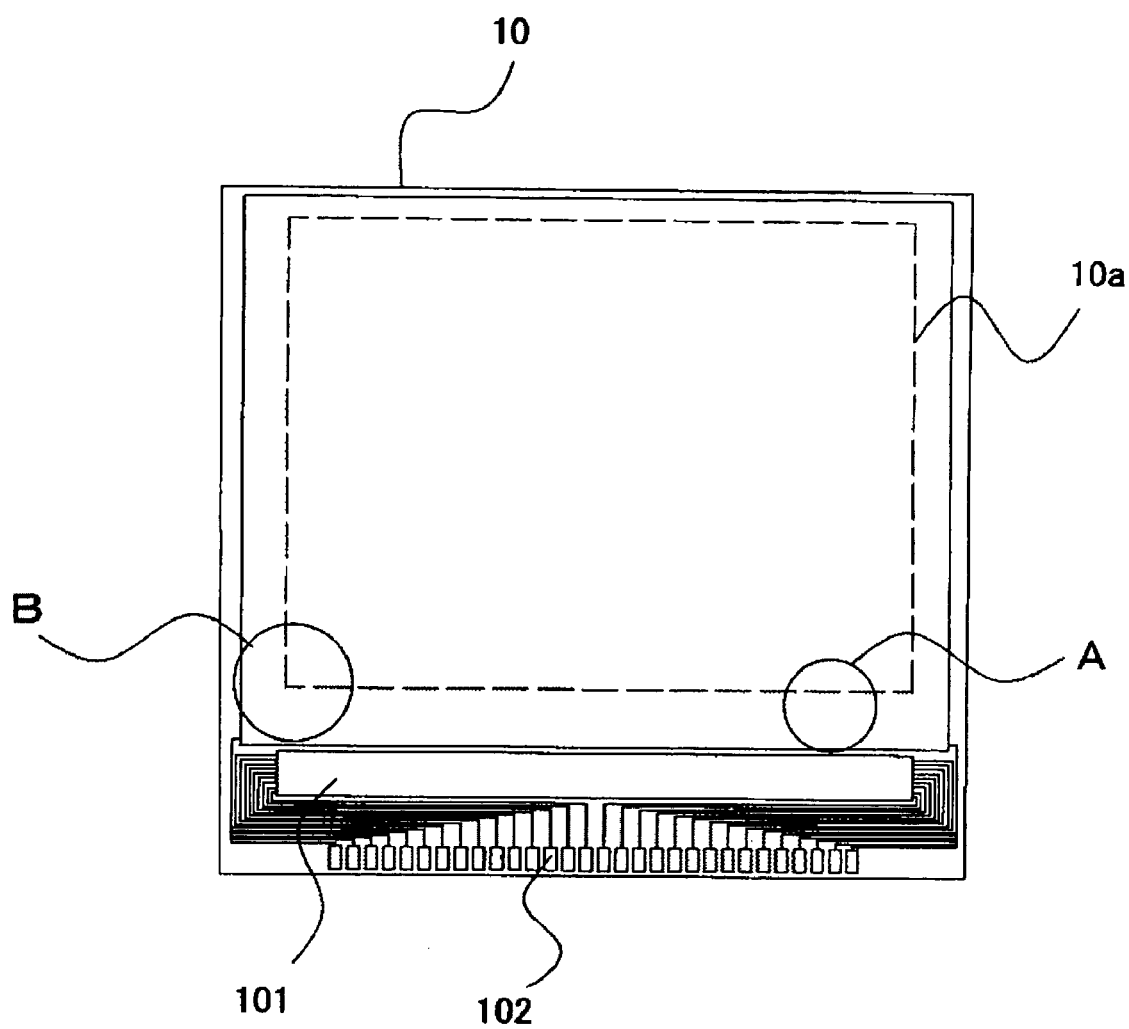
FIG. 6 is a plan view of the electro-optical device only illustrating a construction of the TFT array substrate 10 in FIG. 1.
Figure 7:
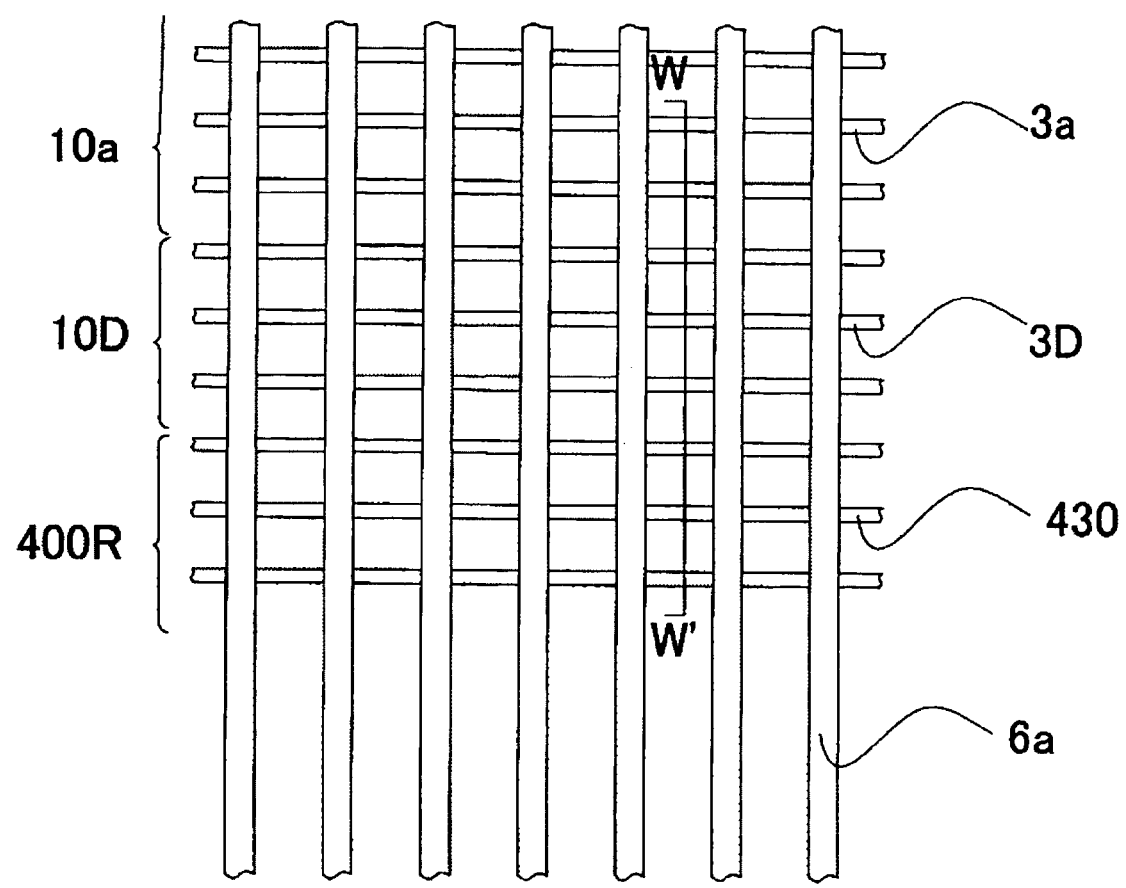
FIG. 7 is a plan view paying attention to only the data lines and the scanning lines formed inside a circle indicated by "A" in FIG. 6.
Figure 8:
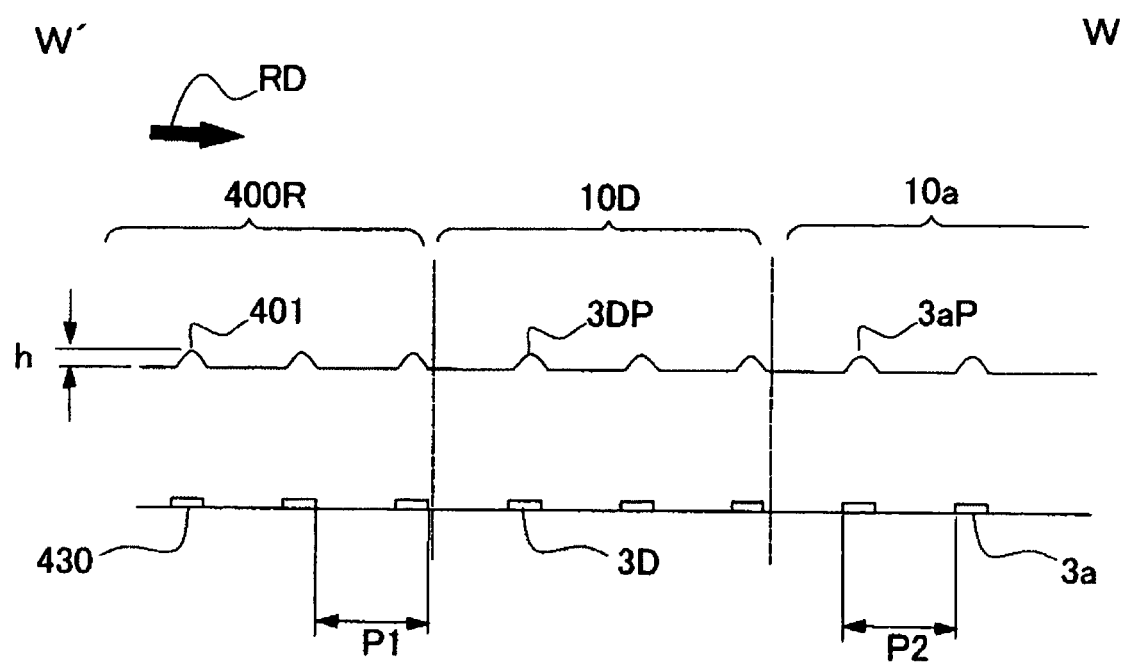
FIG. 8 is a cross-sectional view taken along plane W–W' of FIG. 7 (where only convex portions and the scanning lines specifically associated with the present invention are illustrated, and the other construction is properly omitted)

A construction of the convex portions formed in the peripheral area of the electro-optical device constructed as described above is described with reference to FIGS. 6 to 8 below. FIG. 6 is a plan view of the electro-optical device illustrating only a construction of the TFT array substrate 10 in FIG. 1, FIG. 7 is a plan view paying attention to only the data lines and the scanning lines formed inside a circle indicated by "A" in FIG. 6, and FIG. 8 is a cross-sectional view taken along plane W–W' of FIG. 7. In FIG. 8, only the convex portions and the scanning lines, etc., specifically associated with the present invention are illustrated, and the other construction is properly omitted. Further, in FIG. 8, in order to make the respective layers or the respective members recognizable from the figure, the respective layers and the respective members have different scales.

In FIGS. 6 to 8, the convex portions 401 are formed in a predetermined area 400R between the image display area 10a and the data line driving circuits 101 in the peripheral area of the electro-optical device. More specifically, the convex portions 401 are formed, as shown in FIGS. 7 and 8, outside dummy pixel forming area 10D positioned outside the image display area 10a, as viewed two-dimensionally. In the dummy pixel forming area 10D as shown in FIG. 7, dummy scanning lines 3D made of the same film as the scanning lines 3a are formed, and in addition, all the elements which pixels should include such as dummy TFTs and dummy pixel electrodes not shown are formed. As a result, dummy pixels are constructed. In the first exemplary embodiment, by driving the dummy pixels properly, it is possible to reduce or suppress generation of display unevenness, etc. In FIGS. 7 and 8, three rows of dummy pixels are formed, but this is only an example. Several columns of dummy pixels may be formed in a direction of the data lines 6a (see FIG. 12).

On the other hand, the convex portions 401 are formed caused by a height of the patterns 430 formed of the same film as the scanning lines 3a or the dummy scanning lines 3D. That is, when the patterns 430 are formed on the TFT array substrate 10, step difference is generated between the area in which the patterns 430 are formed and the other area, and the convex portions 401 are formed by so-called "transferring" the aforementioned step difference to the respective layers of the first to third interlayer insulating films 41, 42, 43 and the alignment film 16 (see FIG. 5) formed in both areas. As a result, the convex portions 401 are formed on the alignment film 16 positioned as the uppermost layer. For the same reason, the projected portions 3aP, 3DP are also formed on the scanning lines 3a and the dummy scanning lines 3D.

The patterns 430 are formed to have the same two-dimensional shape (also see FIG. 4) as the scanning lines 3a or the dummy scanning lines 3D, as shown in FIG. 7. That is, the patterns 430 extend in a left and right direction (a row direction) of FIG. 7 on the TFT array substrate 10, and are formed as patterns having a straight line shape perpendicular to the data lines 6a. In the first exemplary embodiment, specifically three rows of patterns 430 are formed. The pitch P1 of the three rows of patterns 430 is equal to the pitch P2 of the scanning lines 3a, as shown in FIG. 8 (in addition, in the first exemplary embodiment, the pitch between the dummy scanning lines 3D, the pitch between the scanning lines 3a and the dummy scanning lines 3D, and the pitch between the dummy scanning lines 3D and the patterns 430 are equal one another).

Accordingly, the convex portions 401 according to the first exemplary embodiment have the following features. First, since the patterns 430 are formed to have the same two-dimensional shape as the scanning lines 3a or the dummy scanning lines 3D, the convex portions 401 and the projected portions 3aP or 3DP have almost the same height h (see FIG. 8). For the same reason, the convex portions 401 are formed in the direction of the projected portions 3aP or 3DP, and in addition, the convex portions 401 are formed successively in the direction. Furthermore, since three rows of patterns 430 are formed, three sets of convex portions 401 are formed similarly. That is, the convex portions 401 according to the first exemplary embodiment are formed to include linear convex portions. In addition, if the height of the projected portions 3aP or 3DP is about 400 nm, it is preferable that the height h is adjusted to be about 100 to 500 nm.

As a result, in the first exemplary embodiment, the convex portions 401 have a shape constituting a so-called "mountain range" together with the projected portions 3aP or 3DP on the alignment film 16 (see FIG. 8).

According to the electro-optical device of the first exemplary embodiment having the aforementioned construction, the following operational advantages can be obtained. First as a premise thereof, a method of manufacturing the TFT array substrate 10 constituting the electro-optical device is briefly described below.

In order to obtain the TFT array substrate 10 shown in FIG. 6, a plurality of TFT array substrates are constructed in a bundle on one sheet of glass substrate having a relatively large area, as shown in FIG. 9. That is, the construction shown in FIGS. 4 and 5 is formed separately correspondingly to the respective areas (areas where the respective TFT array substrates 10 are formed) on the glass substrate, and is also formed in a bundle on the whole surface of the glass substrate. In this case, the patterns 430 described with reference to FIGS. 7 and 8 are also formed correspondingly to the aforementioned respective areas, and the convex portions 401 corresponding to the patterns 430 are thus formed on the alignment film 16 positioned as the uppermost layer correspondingly to the aforementioned respective areas. The alignment film 16 is usually formed to cover the whole surface of the glass substrate.

In the first exemplary embodiment, when performing the rubbing process on the alignment film 16 formed like this, distinct advantages appear. First, when the rubbing process is performed to the alignment film 16 in an arrow direction RD shown in FIG. 9 (that is, when a rotational roller, etc. on which a buff cloth is wound is made to go on in the direction RD), the plurality of TFT array substrates 10 arranged in the up-and-down direction in FIG. 9 are sequentially subjected to the rubbing process. The details thereof are as follows. That is, at a first step, the rubbing process is performed temporarily to a relatively flat surface on which specific elements are not formed (that is, on which the scanning lines 3a, the data lines 6a, the storage capacitors 70, and so on are not formed) after passing the image display area 10a on the first front TFT array substrate 10. At a second step, when the rubbing process goes on to a next TFT array substrate 10, the rotational roller, etc., meets the "mountain range" (the mounting range includes the convex portions 401 and the projected portions 3aP or 3DP as described above) including the data line driving circuits 101 and the convex portions 401 formed on the relevant TFT array substrate 10. At a third step, the rubbing process is continued onto the relevant mountain range, that is, the image display area 10a. At a final fourth step, if passing the image display area 10a in which the aforementioned mountain range is successive, the rotational roller, etc., goes on onto a relatively flat area again. Thereafter, the first to fourth steps are repeatedly performed.

At that time, through the rubbing process, it is not possible to avoid generation of the cut dregs of the alignment film 16, and the cut dregs are mainly attached to the rotational roller. Then, in the course of performing the rubbing process to the plurality of TFT array substrates 10 as described above, the cut dregs attached to the rotational roller occasionally drop, thereby causing the dropped cut dregs to remain on the image display area 10a of each TFT array substrate 10.

In this exemplary embodiment, paying attention to any one TFT array substrate 10, the rotational roller, etc., can be first subjected to a large resistance from the convex portions 401. That is, in the aforementioned description, in a case where the rubbing process is performed onto the relatively flat "plain" (a case of the above first or fourth step), the rotational roller, etc., is not subjected to a large resistance. However, when the rotational roller, etc., reaches the first convex portions 401 of the "mountain range" successive to the "plain" (a case of the above second step), the rotational roller, etc., is subjected to a much larger resistance than before. Therefore, the cut dregs attached to the rotational roller are first detached in the "mountain" portion by a relative large amount. Thereafter, when the rotational roller, etc., reaches the "mountain range" (a case of the above third step), the cut dregs attached to the rotational roller are gradually detached, and when the rotational roller reaches the image display area 10a, there does not occur that the cut dregs are much dropped.

According to the rubbing process in this aspect, it is possible to allow the generated cut dregs to exist only around the convex portions 401. Therefore, according to the first exemplary embodiment, since the cut dregs generated in the rubbing process mainly exist only around the convex portions 401 on the area 400R, it is possible not to allow the cut dregs to reach the image display area 10a.

As a result, according to the first exemplary embodiment, since generation of alignment failure due to the cut dregs in the image display area 10a can be prevented, it is possible to display images with higher quality.

Further, according to the first exemplary embodiment, since existence of the dummy pixel area 10D including the dummy pixels is not intended to address or solve the problem of the cut dregs, enlargement of the electro-optical device is not caused. On the contrary, in the electro-optical device according to the first exemplary embodiment, the miniaturization and the higher accuracy can be better accomplished.

Further, since the convex portions 401 according to the first exemplary embodiment have almost the same height h as the projected portions 3aP or 3DP as described above and are formed to be successive in the direction of the projected portions 3aP or 3DP, and three sets of the convex portions are formed in parallel along the projected portions 3aP or 3DP, it is possible to better form the aforementioned "mountain range". Therefore, according to the first exemplary embodiment, it is possible to more obtain the operational advantage that the cut dregs of the alignment film 16 are allowed to exist only around the convex portions 401 and not allowed to reach the image display area 10a.

In addition, it is preferable that the height h of the convex portions 401 is equal to or less than the height of the projected portions 3aP or 3DP (that is, as described above, if the height of the latter is about 400 nm, the height h of the former may be set to 100 to 500 nm). In this case, if the height h of the convex portions 401 is too larger than the height of the projected portions, the rubbing process may be considerably hindered.

In the first exemplary embodiment, although the patterns 430 formed of the same film as the scanning lines 3a or the dummy scanning lines 3D are used to form the convex portions 401, the present invention is not limited to the exemplary embodiment. For example, in place of forming the patterns 430 out of the same film as the scanning lines 3a or the dummy scanning lines 3D, the patterns for forming the convex portions 401 may be formed of the same film as the capacitor lines 300 constituting the storage capacitors 70 described with reference to FIG. 5 (the capacitor line 300 is an element extending in a direction of the scanning lines 3a (see FIG. 4)). The patterns parallel to the scanning lines 3a may be formed on the area 400R out of the same film as other elements, for example, the relay layer 71, the lower light shielding film 11a and the data lines 6a, and then the convex portions 401 may be caused by the height of the relevant patterns. Furthermore, by using these examples together, it is possible to preferably adjust the height of the patterns, and that the height of the convex portions 401.

The present invention is not limited to the example of forming the convex portions 401 caused by the height of the patterns. For example, without forming the patterns 430 shown in FIGS. 7 and 8 in the area where the convex portions 401 should be formed, by additionally performing a process for separately providing the projected portions on the third interlayer insulating film 43 shown in FIG. 5, the convex portions 401 may be formed. In this case, the projected portions can be formed by forming a new film on the third interlayer insulating film 43 and then performing a photolithography and etching process to the new film, or by performing the photolithography and etching process directly to the third interlayer insulating film 43.

(Second Exemplary Embodiment)

Figure 10:
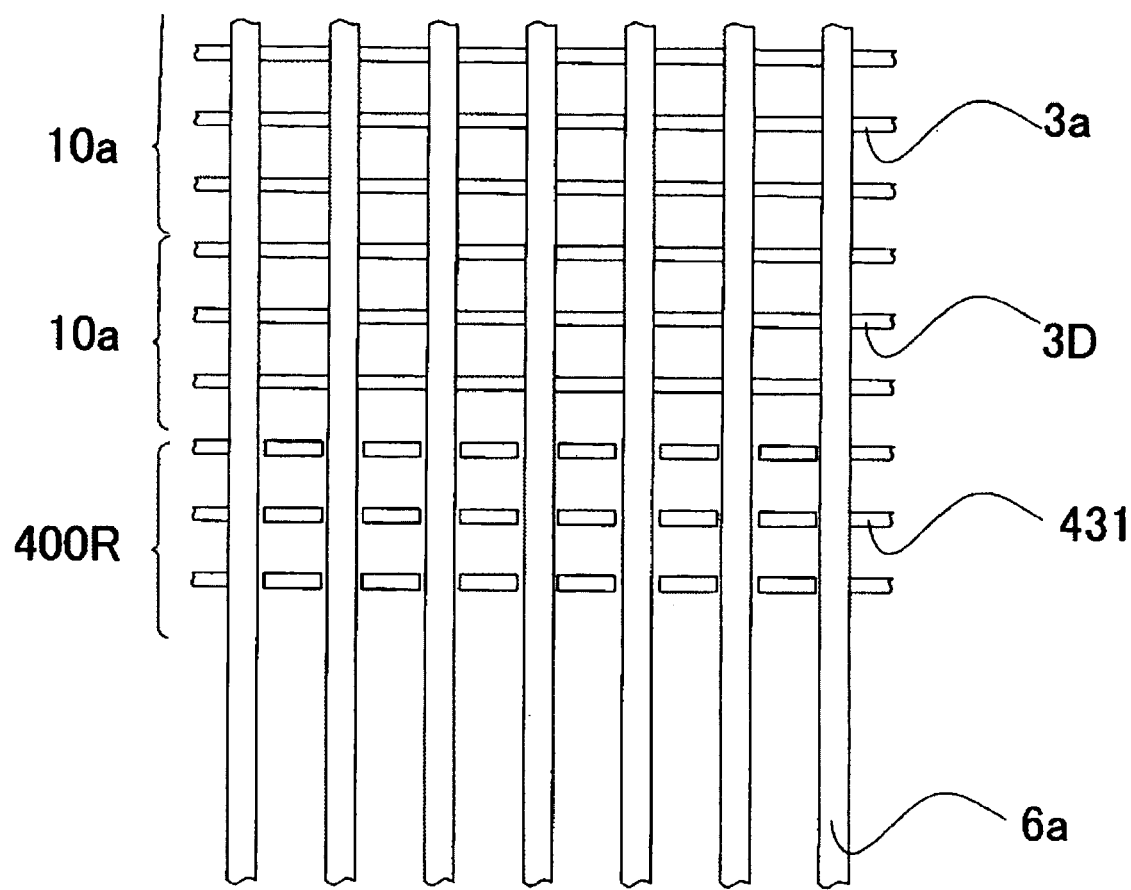
FIG. 10 is a plan view only illustrating the data lines and the scanning lines according to a second exemplary embodiment with the same intention as FIG. 7.

A second exemplary embodiment of the present invention is described below with reference to FIG. 10. FIG. 10 is a plan view illustrating only the data lines and the scanning lines according to the second exemplary embodiment with the same intention as FIG. 7. In the second exemplary embodiment, the construction and operation are completely equal to those of the aforementioned "electro-optical device". Therefore, description thereof is omitted, and distinct features of the second exemplary embodiment is mainly described.

In the second exemplary embodiment, as shown in FIG. 10, the patterns 431 are formed intermittently in a direction of the scanning lines 3a or the dummy scanning lines 3D. The intermittent points lie in the portions in which the data lines 6a extend. The scanning lines 3a and the dummy scanning lines 3D are formed to be completely equal to FIG. 7.

In this exemplary embodiment, it is also possible to obtain almost the same operational advantage as the aforementioned first exemplary embodiment. In particular, according to the second exemplary embodiment, since parts where the data lines 6a and the patterns 431 intersect each other do not exist, the height of the convex portions in that parts does not have displacements (in FIG. 7 of the first exemplary embodiment, in the parts where the data lines 6a extend, the height of the convex portions 401 is considered as addition of the height of the data lines 6a to the height of the patterns 430), so that it is possible to enhance the possibility of performing a better rubbing process. That is, since a portion of which the height is varied does not exist in any one set of convex portions, the rubbing process can be more smoothly performed.

(Third Exemplary Embodiment)

Figure 11:
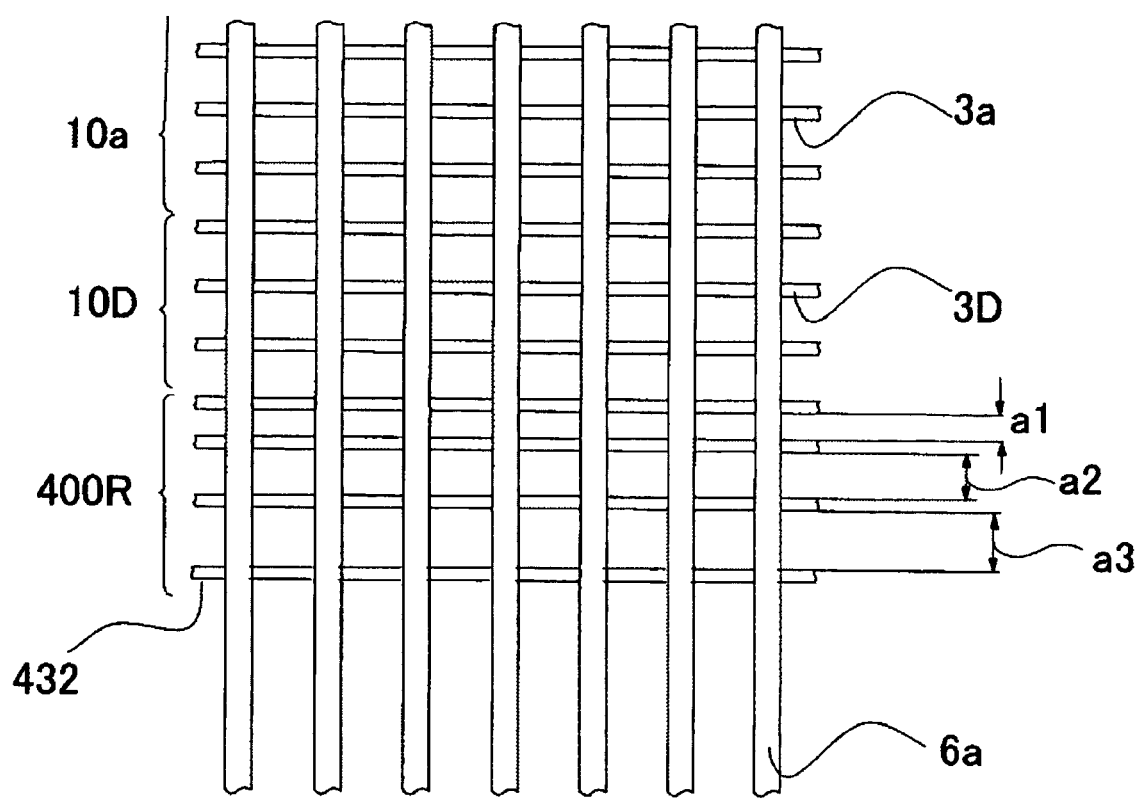
FIG. 11 is a plan view only illustrating the data lines and the scanning lines according to a third exemplary embodiment with the same intention as FIG. 7.

A third exemplary embodiment of the present invention is described below with reference to FIG. 11. FIG. 11 is a plan view illustrating only the data lines and the scanning lines according to the third exemplary embodiment with the same intention as FIG. 7. In the third exemplary embodiment, the construction and operation are completely equal to those of the aforementioned "electro-optical device". Therefore, a description thereof is omitted, and distinct features of the third exemplary embodiment is mainly described.

In the third exemplary embodiment, as shown in FIG. 11, the pitch between the patterns 432 becomes gradually larger as going on from a place close to the image display area 10a to a place apart from the image display area. That is, the pitch a1 between the patterns 432 closest to the image display area 10a, the pitch a2 adjacent thereto and the pitch a3 further apart therefrom satisfy a1<a2<a3. As a result, the pitch between the convex portions to be formed on the patterns 432 becomes gradually larger from the image display area 10a.

In this exemplary embodiment, it is clear that it is possible to obtain almost the same operational advantage as the first exemplary embodiment. Specifically, according to the third exemplary embodiment, since the pitch between the convex portions caused by the height of the patterns 432 as well as between the patterns 432 becomes gradually larger as going on apart from the image display area 10a, there is an advantage that the possibility of performing a more suitable rubbing process can be enhanced. That is, according to the third exemplary embodiment, in the area where the patterns 432 are formed, that is, the area where the convex portions are formed, there is an advantage that a drastic change cannot be allowed to be caused in the rubbing process. More specifically, in the third exemplary embodiment, since the rotational roller, etc., is subjected to a relatively large resistance in the convex portion positioned in the head of the "mountain range" and the resistance is decreased as passing through the convex portions, the possibility that drop of the cut dregs of the alignment film 16 attached to the rotational roller can occur in the convex portion positioned in the head is increased.

As a result, according to the third exemplary embodiment, from the aforementioned point of view, the aforementioned "mountain range" can be more properly formed, so that it is possible to more effectively obtain the operational advantage mentioned in the first exemplary embodiment.

In FIG. 11, although the pitch a1 between the patterns 432 most close to the image display area 10a is formed to be smaller than the pith between the scanning lines 3a and the pitch between the dummy scanning lines 3D, it is preferable that both pitches are equal to each other. As a result, even when going on from the peripheral area to the image display area 10a, the drastic change cannot be caused in the rubbing process.

In place of the exemplary embodiment of FIG. 11, the pitch between the patterns may become gradually smaller as going on apart from the image display area 10a.

(Fourth Exemplary Embodiment)

Figure 12:
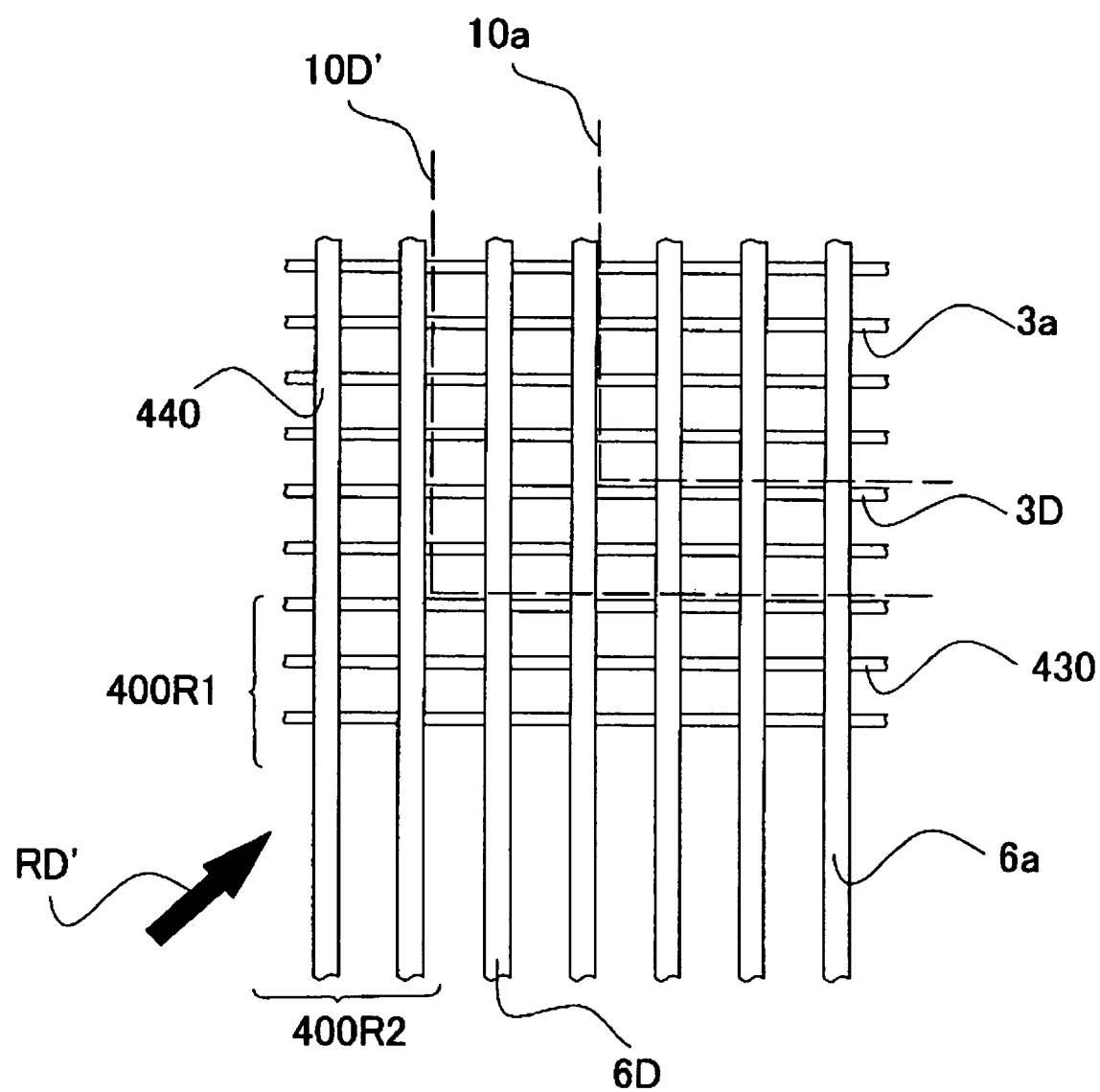
FIG. 12 is a plan view only paying attention to the data lines and the scanning lines formed inside a circle indicated by "B" in FIG. 6, with the same intention as FIG. 7.

A fourth exemplary embodiment of the present invention is described below with reference to FIG. 12. FIG. 12 is a plan view paying attention to only the data lines and the scanning lines formed inside a circle indicated by "B" in FIG. 6 with the same intention as FIG. 7. In the fourth exemplary embodiment, the construction and operation are completely equal to those of the aforementioned "electro-optical device". Therefore, a description thereof is omitted, and distinct features of the fourth embodiment are mainly described.

In the fourth exemplary embodiment, a dummy pixel forming area 10D' not shown in FIG. 7 is provided as shown in FIG. 12. In the dummy pixel forming area 10D', in addition to the dummy scanning lines 3D formed parallel to the scanning lines 3a, the dummy data lines 6D formed parallel to the data lines 6a are further provided. Accordingly, the dummy pixels are formed to surround the corner portions of the image display area 10a.

In the fourth exemplary embodiment, specific patterns 440 are formed in an area 400R2 outside the dummy data lines 6D along the data lines 6a or the dummy data lines 6D. On the other hand, similarly to FIG. 7, the patterns 430 are formed in an area 400R1 along the scanning lines 3a or the dummy scanning lines 3D. Accordingly, in the fourth exemplary embodiment, the convex portions (not shown) are formed along two sides of the image display area 10a having a rectangular shape.

According to this exemplary embodiment, like an arrow direction RD' shown in FIG. 12, even when the rubbing process is performed in an oblique direction, almost the same operational advantage as the first exemplary embodiment can be obtained.

(Fifth Exemplary Embodiment)

Figure 13:
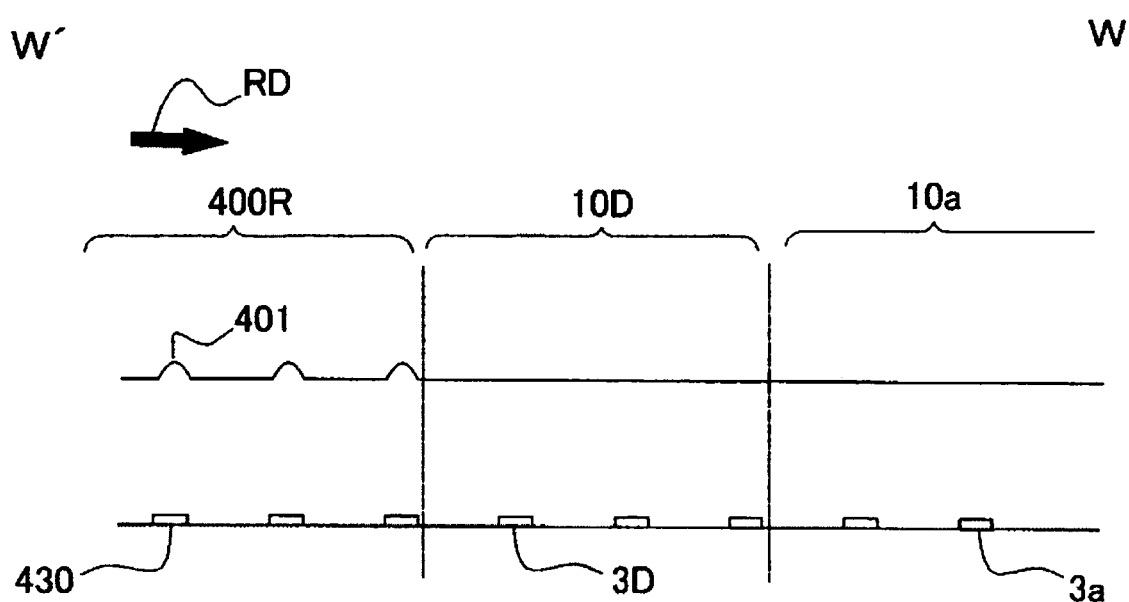
FIG. 13 is a schematic with the same intention as FIG. 8, and illustrates an aspect in which projected portions do not exist.

A fifth exemplary embodiment of the present invention is described below with reference to FIG. 13. FIG. 13 illustrates an exemplary embodiment in which the projected portions do not exist with the same intention as FIG. 8. In the fifth exemplary embodiment, the construction and operation are completely equal to those of the aforementioned "electro-optical device". Therefore, a description thereof is omitted, and distinct features of the fifth exemplary embodiment is mainly described.

In the fifth exemplary embodiment, the projected portions 3aP or 3DP (See FIG. 8) caused by the height of the scanning lines 3a or the dummy scanning lines 3D are not formed as shown in FIG. 13. This exemplary embodiment is realized, for example, by performing a proper planarization process, such as a CMP (Chemical Mechanical Polishing) process, an SOG (Spin On Glass) process, an etch-back process, or the like to a surface of the third interlayer insulating film 43. In addition, this exemplary embodiment can be realized by forming trenches in at least one of the TFT array substrate 10, the base insulating film 12, the first interlayer insulating film 41 and the second interlayer insulating film 42 and then burying wires, such as the scanning lines 3a or the TFTs 30 in the trenches, in place of or in addition to the planarization process. By performing planarization of the alignment film 16 as well as the third interlayer insulating film 43, it is possible to obtain an advantage that it is possible to reduce or prevent alignment failure of the liquid crystal molecules in the liquid crystal layer 50 due to the step difference of the projected portions 3aP or 3DP from occurring.

The fifth exemplary embodiment is provided such that the convex portions 401 are formed when the image display area 10a is planarized. That is, the convex portions 401 are formed by not performing the aforementioned process in the relevant area, or by performing the projected portion forming process onto the third interlayer insulating film 43 for the purpose of forming the convex portions 401 only in the relevant area.

In addition, in this case, it cannot be said that the convex portions 401 exist in the direction of the projected portions, but the convex portions exist in the direction of the scanning lines 3a or the dummy scanning lines 3D. Furthermore, the pitch between the convex portions 401 is equal to the pitch between the scanning lines 3a or the pitch between the dummy scanning lines 3D.

In this exemplary embodiment, it is clear that it is possible to obtain almost the same operational advantage as the first exemplary embodiment. As a result, the present invention does not necessarily require existence of the projected portions caused by the height of the scanning lines 3a or the data lines 6a. Even if the projected portions do not exist (that is, even if the alignment film 16 in the image display area 10a is planarized), it is possible to form the aforementioned "mountain range" by using only the "convex portions 401" (see FIG. 13).

Although expression of the convex portions has been used in the above exemplary embodiments, an exemplary embodiment in which step portions are formed or an exemplary embodiment in which trenches are formed in a space between the convex portions is also included in the present invention.

(Exemplary Electronic Apparatus)

Figure 14:
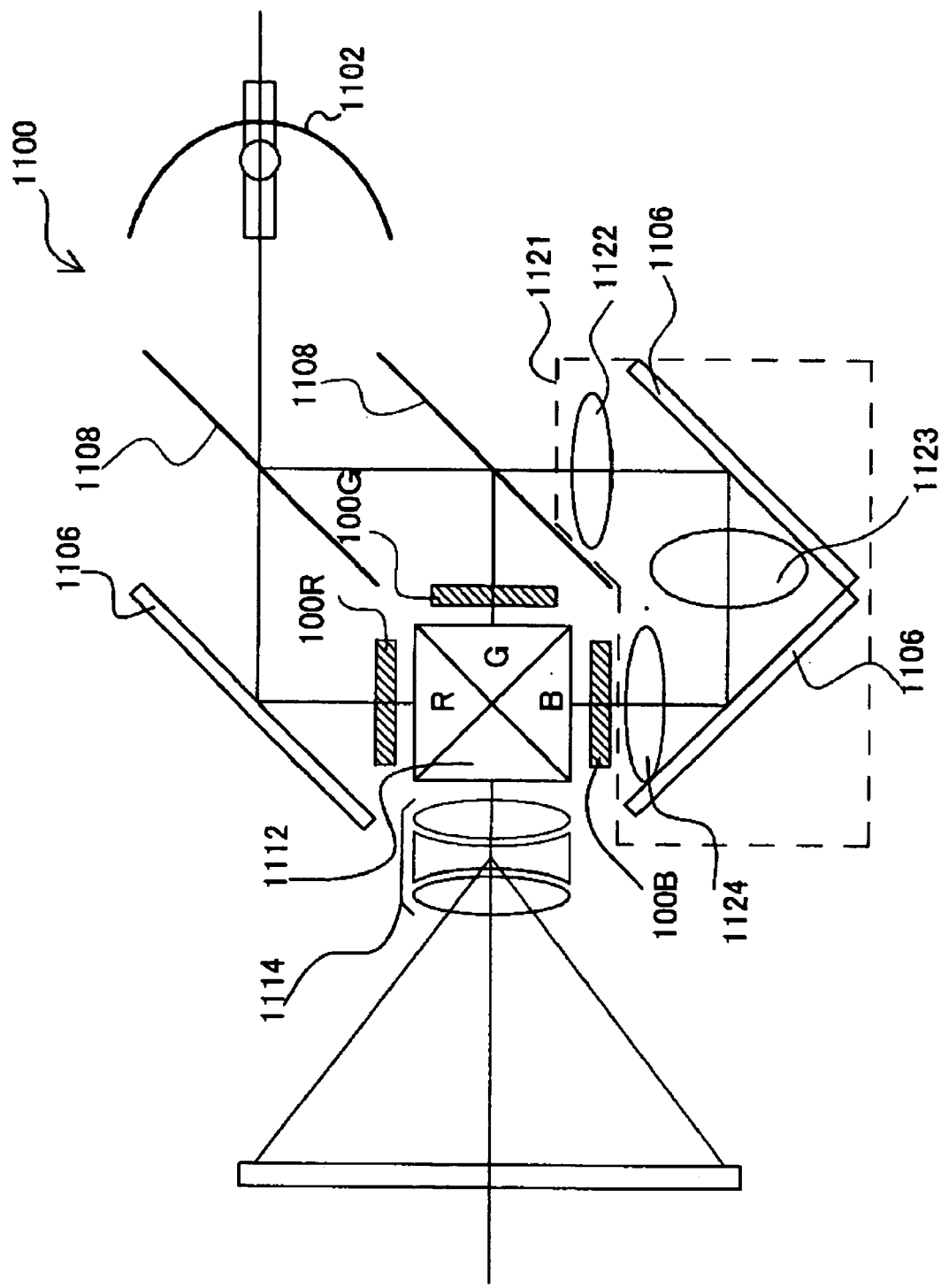
FIG. 14 is a plan view of a projection liquid crystal display apparatus according to an exemplary embodiment of the present invention.

With respect to an exemplary embodiment of a projection color display apparatus, which is an example of an electronic apparatus employing the electro-optical devices described above in detail as light valves, the whole construction thereof, specifically an optical construction thereof, is described below. FIG. 14 is a schematic cross-sectional view of the projection color display apparatus.

In FIG. 14, a liquid crystal projector 1100 which is an example of the projection color display apparatus according to this exemplary embodiment is constructed as a projector employing three liquid crystal modules including a liquid crystal device in which a driving circuit is mounted on a TFT array substrate, and using them as light valves for RGB 100R, 100G and 100B. In the liquid crystal projector 1100, when projection light is emitted from a lamp unit 1102 which is a white light source, such as a metal halide lamp, the light is divided into light components R, G and B corresponding to the three primary colors R, G, B through three sheets of mirrors 1106 and two sheets of dichroic mirrors 1108, and the light components are guided into the light valves 100R, 100G, 100B corresponding to the respective colors. At that time, specifically the light component B is guided through a relay lens system 1121 including an input lens 1122, a relay lens 1123 and an output lens 1124 so as to reduce or prevent light loss due to a long light path. The light components, corresponding to the three primary colors, modulated through the light valves 100R, 100G, 100B are synthesized again through a dichroic prism 1112, and then the synthesized light is projected as a color image to a screen 1120 through a projection lens 1114.

The present invention is not limited to the aforementioned exemplary embodiments, but may be properly changed or modified without departing from the scope of the invention. An electro-optical device and electronic apparatus to which such changes and modifications are made are included in the scope of the present invention.

What is claimed is:

1. An electro-optical device, comprising:
   a substrate;
   data lines;
   scanning lines extending in a direction crossing the data lines;
   switching elements to which a scanning signal is supplied through the scanning lines;
   pixel electrodes to which an image signal is supplied through the data lines and the switching elements;
   an alignment film formed on the pixel electrodes;
   the substrate having an image display area defined as an area to form the pixel electrodes and the switching elements, and a peripheral area defining the periphery of the image display area, the alignment film being formed in the image display area and the peripheral area, and convex portions being formed in the alignment film at least at a part of the peripheral area and extending in a direction substantially perpendicular to a rubbing direction of the alignment film;
   projected portions caused by the height of at least one of the data lines and the scanning lines being formed in the alignment film at a position directly adjacent to the display area,
   the convex portions being formed along a direction in which the scanning lines or the data lines extend and the convex portions including a plurality of linear convex portions which are formed along the direction in which the scanning lines or the data lines extend; and
   the pitch between the linear convex portions being equal to the pitch between the projected portions.

2. The electro-optical device according to claim 1, further comprising a driving circuit on the substrate, the convex portions being provided in an area between the image display area and the driving circuit.

3. The electro-optical device according to claim 1, further including a dummy pixel forming area formed outside the image display area, the convex portions being formed outside the dummy pixel forming area.

4. The electro-optical device according to claim 1, projected portions caused by the height of at least one of the data lines and the scanning lines being formed in the alignment film at a position directly adjacent to the display area, and the height of the convex portions being equal to the height of the projected portions.

5. The electro-optical device according to claim 1, the convex portions being formed parallel to the direction in which the scanning lines or the data lines extend.

6. The electro-optical device according to claim 1, the convex portions being formed along the peripheral portion of the image display area opposite to the direction of a rubbing process performed on the alignment film.

7. The electro-optical device according to claim 1, the substrate having a rectangular outer configuration in plan view, and the image display area having a shape similar to the outer configuration of the substrate, and the convex portions being formed along one side or two adjacent sides of the image display area.

8. The electro-optical device according to claim 1, the convex portions being caused by the height of a pattern formed of the same film as the data lines, the scanning lines, or the switching elements.

9. An electronic apparatus, comprising:
the electro-optical device according to claim 1.

10. An electro-optical device, comprising:
a substrate:
data lines:
scanning lines extending in a direction crossing the data lines:
switching elements to which a scanning signal is supplied through the scanning lines;
pixel electrodes to which an image signal is supplied through the data lines and the switching elements;
an alignment film formed on the pixel electrodes;
the substrate having an image display area defined as an area to form the pixel electrodes and the switching elements, and a peripheral area defining the periphery of the image display area, the alignment film being formed in the image display area and the peripheral area, and convex portions being formed in the alignment film at least at a part of the peripheral area and extending in a direction substantially perpendicular to a rubbing direction of the alignment film;
projected portions caused by the height of at least one of the data lines and the scanning lines being formed in the alignment film at a position directly adjacent to the display area,
the convex portions being formed along a direction in which the scanning lines or the data lines extend, and the convex portions including a plurality of linear convex portions which are formed along the direction in which the scanning lines or the data lines extend; and
the pitch between the linear convex portions being gradually increased or decreased with increasing distance from the image display area, from a place close to the image display area to a place apart from the image display area.

* * * * *